Aug. 28, 1956
C. H. MOORE
2,760,670
MANWAY FITTINGS
Filed Dec. 8, 1952
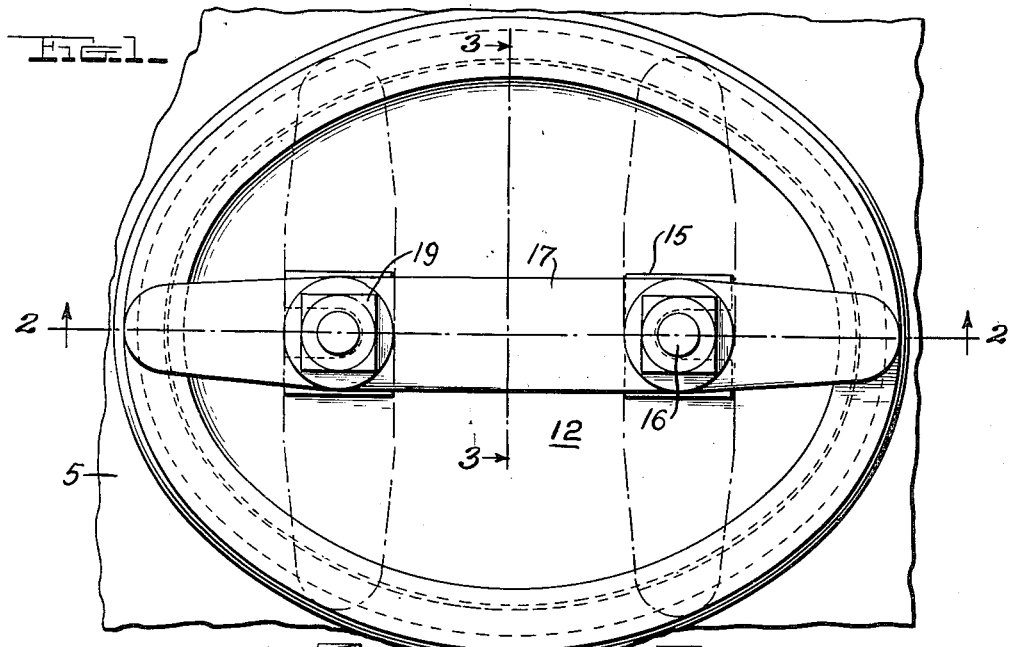
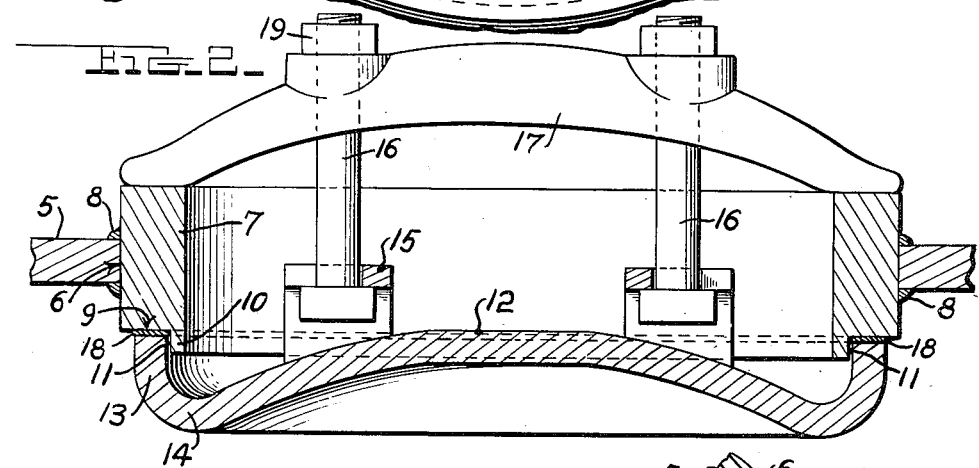
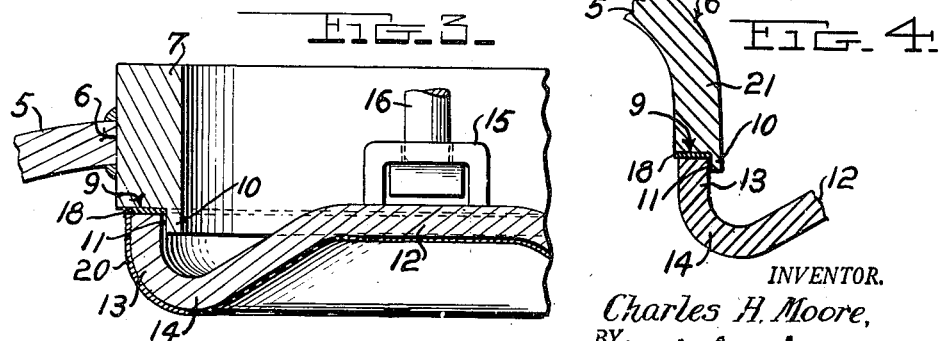
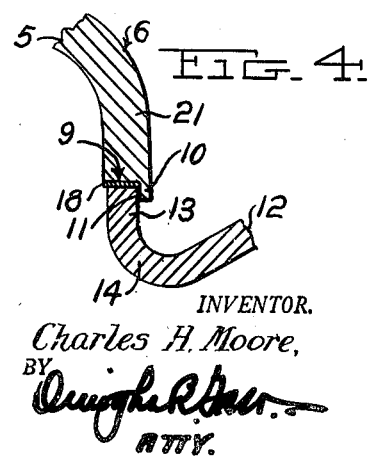
INVENTOR.
Charles H. Moore,
BY
ATTY.

United States Patent Office 2,760,670
Patented Aug. 28, 1956

2,760,670

MANWAY FITTINGS

Charles H. Moore, West Chester, Pa., assignor to Lenape Hydraulic Pressing & Forging Co., West Chester, Pa., a corporation of Delaware Application December 8, 1952, Serial No. 324,710

1 Claim. (Cl. 220—25)

This invention is a manway fitting particularly applicable to high pressure vessels.

An object of the invention is to provide a fitting for the manway opening of the self energized type, wherein the pressure within the vessel is utilized in maintaining a tight sealing fit of the cover within the opening, and wherein the construction is such as to improve the cantilever beam in the cover as well as to well distribute the stresses resulting from excess pressures properly throughout the cover member.

A further object of the invention is to provide a fitting of such character that the necessary machining of the contacting parts between the opening and the cover may be expeditiously and inexpensively performed and in such manner as to bring about a proper and accurate sealing between cover and opening with a gasket interposed therebetween in insuring a proper sealing.

A further object of the invention is to provide a fitting and cover therefor characterized by a construction that obviates weakening by machining operations, avoids reduction of metal thickness by such operations which eliminates the faults of flat flange sealing engagement heretofore employed, and which avoids sharp notches which have heretofore contributed to pressure failures.

With the foregoing objects in view, together with others which will appear as the description proceeds, the invention consists in the novel construction, combination and arrangement of parts, all as will be described more fully hereinafter, illustrated in the drawing, and particularly pointed out in the claim.

In the drawings:

Fig. 1 is a top plan view of a fragment of a pressure vessel shell showing as applied thereto a manway fitting involving my invention, Fig. 2 is a longitudinal sectional view taken substantially upon line 2—2 of Fig. 1, Fig. 3 is a transverse sectional view taken substantially upon line 3—3 of Fig. 1, and Fig. 4 is a detail fragmentary sectional view showing a slight modification of the invention.

Referring now more particularly to the drawing, the numeral 5 indicates the shell of a high pressure vessel with which the manway fitting is associated, the vessel in the present embodiments of the invention being provided with an opening, in this instance of elliptical shape, indicated at 6. The fitting of my invention in its present embodiment includes a relatively heavy steel ring 7 of a size and shape corresponding to the opening 6 in the shell of the pressure vessel, and is of a depth substantially greater than the thickness of the shell. This ring will be fitted snugly within the opening 6 and will be secured therein by welding indicated at 8 substantially midway the depth of the ring so that a part of the latter will extend to the interior of the vessel while the upper end will project beyond the outer surface thereof.

The lower or inner end of the ring 7 will be provided with a bearing face indicated at 9, the said face being disposed at substantially right angles to the axis of the ring, and this face is terminated by a lip 10 forming a continuation of the inner edge of the ring. This lip 10 provides a shoulder 11 disposed at right angles to the face 9. As shown in the drawing, the lip 10 is coterminous with the ring 7 so that the seat or bearing face 9 of the shoulder 11 extend entirely around the ring.

The closure or cover member comprises a forged steel plate represented generally at 12 of a shape to correspond with the ring 7, and provided with a marginal upstanding flange 13 disposed substantially parallel to the axis of the opening. The flange 13 is of equal thickness with the cover plate 12 and merges with the latter in the curved surface indicated at 14, the flange being so formed as to rest upon the bearing surface 9 and behind the shoulder 11 provided by the depending lip 10.

The cover 12 may be secured in any approved manner within the ring 7. In the present instance, the cover is provided with upstanding spaced bolt clips 15 to receive the lower or headed ends of bolts 16 to engage at their outer or upper ends within suitable openings in a spanner member or yoke 17 disposed in the major axis of the cover plate and of sufficient length to rest at its ends upon the outer edges of the ring 7. It will be understood that instead of securing the cover with a single spanner disposed longitudinally of the cover, a pair of relatively short transverse spanner members may be employed as shown by broken lines in Fig. 1 of the drawings.

To insure a tight sealing of the cover plate with the ring, the bearing face 9, the shoulder 11, and the upper edge of the flange 13 are all machined, and accommodate between them the gasket 18.

From this construction it is apparent that with the parts assembled in the manner disclosed by Figs. 2 and 3, and upon tightening of the nuts 19 upon the bolts 16, the plate 12 will be drawn in the direction of the yoke or spanner so as to bring about a tight sealing engagement between the upper edge of flange 13 and the gasket 18 interposed between the said flange and the bearing face and shoulder 11. Pressure within the shell will be exerted against the plate 12 as well as against the flange 13, thus aiding in this tight sealing engagement. Due to the particular formation and construction of the flange and the manner in which it projects from the edges of the plate 12, there is no weakening action, and any tendency of excessive pressure to contract the flange 13 will be resisted by the shoulder 11 formed on the outer face of the depending lip 10. In this manner, the stresses incident to excessive internal pressures will be equally distributed throughout the cover plate and will be utilized in effecting a tight closure of the fitting.

Fittings made in accordance with the invention may be fabricated in varying sizes as requirements may demand, and the cover members 12 attached thereto by the spanner or yoke members 17 as a "package" fitting to be applied to the proper size opening of a pressure vessel. The stresses incident to the application of the cover plate 12 in effective sealing engagement will be borne entirely by the ring 7 as will be understood.

As shown in Fig. 3 of the drawing, the cover plate 12 may be constructed of a bi-metallic or clad material presenting a non-corrosive surface to the contents of the vessel, the clad material being indicated at 20. In manway covers heretofore proposed it has been difficult to devise means for effectively coating all inner surfaces of the cover plate against corrosion. In the present instance, however, the construction here proposed obviates this difficulty in that after being formed in the manner shown, the corrosion resistant inner surface of the plate 12 assures against corrosive action and consequent contamination of the vessel contents.

In Fig. 4 of the drawing there is illustrated a slight modification of the invention, wherein the ring 7 is dispensed with and the edges of the shell or head 5 defining the opening are turned inwardly to provide a depending ring 21 coterminous with the opening. In this instance, the bearing face 9 as well as the angular shoulder 11 will be machined as in the preferred embodiment of the invention, so that the gasket 18 will be properly maintained in tight sealing engagement when held clampingly with said surfaces by the pressure exerted by flange 13.

From the foregoing it is apparent that I have provided a manyway fitting of extremely simple construction, which may be manufactured by simple processes and at low cost, which may be quickly and easily applied or assembled within the opening of the pressure vessel, and which will prove thoroughly effective in the attainment of its various objects.

I claim:

In a manway fitting, an elliptical ring having its entire outer surface unbroken and parallel to the axis of said ring to fit and be affixed midway the ends of said ring to straight unbroken edges of a shell opening corresponding to the shape and size of said ring, bearing surfaces on the inner and outer ends of said ring disposed at substantially right angles to the axis of the latter, a cover plate separate from and corresponding to the shape of said ring disposed over the inner end of the latter, a continuous flange projecting at right angles from the edges of said plate and resting in sealing engagement upon said inner bearing surface with its outer edges disposed inwardly of the outer edges of the latter, a yoke disposed across the opposite side of said ring with its ends resting upon the outer bearing surface of the latter inwardly of the outer periphery of said ring, and bolts secured at one end to said plate and engaged at their opposite ends with said yoke to hold the latter clampingly engaged upon said bearing face.

References Cited in the file of this patent
UNITED STATES PATENTS

| | | |
|---|---|---|
| 62,576 | Towne | Mar. 5, 1867 |
| 309,352 | Moore | Dec. 16, 1884 |
| 446,151 | Munroe | Feb. 10, 1891 |
| 1,453,916 | Cashmer | May 1, 1923 |
| 1,966,851 | Dean | July 17, 1934 |
| 2,116,170 | Hall | May 3, 1938 |